United States Patent

Slocum et al.

(10) Patent No.: US 6,640,880 B1
(45) Date of Patent: Nov. 4, 2003

(54) HEAT EXCHANGER RECESSED BASKET LIFTING COVER

(75) Inventors: William D. Slocum, Belmont, NY (US); Clair F. Updyke, Andover, NY (US)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/269,774

(22) Filed: Oct. 15, 2002

(51) Int. Cl.[7] ............................................... F23L 15/02
(52) U.S. Cl. ............................. 165/8; 165/10; 165/76; 294/81.56; 294/81.5
(58) Field of Search ............................. 165/4, 8, 9, 10, 165/76; 294/81.5, 81.56

(56) References Cited

U.S. PATENT DOCUMENTS

| | | | | |
|---|---|---|---|---|
| 4,209,060 A | * | 6/1980 | Wiking et al. | 165/8 |
| 4,552,204 A | * | 11/1985 | Bellows | 165/10 |
| 4,739,822 A | * | 4/1988 | Mergler | 165/10 |
| 5,454,418 A | * | 10/1995 | Brophy et al. | 165/8 |
| 5,713,411 A | * | 2/1998 | Fierle | 165/9 |
| 5,893,406 A | * | 4/1999 | Brophy | 165/8 |

* cited by examiner

Primary Examiner—Christopher Atkinson
(74) Attorney, Agent, or Firm—Russell W. Warnock

(57) ABSTRACT

A cover for a heat exchange element basket assembly includes a metal sheet and at least one lifting lug. A vertical groove extends inward from the outer surface of the metal sheet. Each lifting lug is a horizontal plate having an opening extending vertically there through, an outer edge, and a shape which is substantially complementary to the cross-sectional profile of the groove. The lifting lug is mounted within the groove, such that the outer edge of the lifting lug does not extend beyond the outer surface of the metal sheet.

9 Claims, 5 Drawing Sheets

HEAT EXCHANGER RECESSED BASKET LIFTING COVER

BACKGROUND OF THE INVENTION

This invention relates generally to rotary heat exchangers. More particularly, the present invention relates to a device for the lifting of baskets having heat transfer elements into and out of such air preheaters.

Conventional rotary regenerative air preheaters are commonly employed to transfer heat from the flue gases exiting a furnace to the incoming combustion air. Rotary regenerative preheaters have a rotor rotatably mounted in a casing or housing. The rotor supports heat exchange element basket assemblies, each having stacked heat transfer plates for the absorption of heat from a hot flue gas stream extinguish the furnace.

Generally, a heat exchange element basket assembly supports the heat exchange elements in a frame work having end plates. The end plates include one or more lifting lugs which allow the heat exchange element basket assemblies to be lifted into or out of the compartments of the air preheater rotor by a crane or other lifting apparatus. Presently, the lifting lugs have to be removed after the basket assembly is installed, to prevent interference with adjacent basket or rotor structure. Due to erosion and corrosion, the basket assemblies will be typically replaced multiple times during the operational life of an air preheater. The lifting lugs must be re-welded to the baskets prior to replacement of the baskets and removed from the baskets after replacement, thereby increasing the cost and time required to replace the heat exchange element basket assemblies.

SUMMARY OF THE INVENTION

Briefly stated, the invention in a preferred form is a cover for a heat exchange element basket assembly which includes a metal sheet and at least one lifting lug. A vertical groove extends inward from the outer surface of the metal sheet. Each lifting lug comprises a horizontal plate having an opening extending vertically there through, an outer edge, and a shape which is substantially complementary to the cross-sectional profile of the groove. The lifting lug is mounted within the groove, such that the outer edge of the lifting lug does not extend beyond the outer surface of the metal sheet.

Preferably, the groove has a V-shape and the plate has a trapezoid shape, with the side edges of the lifting lug being welded to the sides of the groove.

First and second lifting lugs may be mounted in upper and lower portions of the groove. Alternatively, a single lifting lug may be mounted within the groove at the vertical centerline.

The outer edge of the lifting lug may be recessed behind the outer surface of the metal sheet. Alternatively, the outer edge of the lifting lug may be flush with the outer surface of the metal sheet.

It is an object of the invention to provide a cover for a heat exchange element basket assembly which does not require modification in the field each time the assembly is installed or removed.

It is also an object of the invention to provide a cover for a heat exchange element basket assembly which has additional rigidity.

It is further an object of the invention to provide a cover for a heat exchange element basket assembly which has lifting lugs which are permanently installed in a controlled and reliable shop environment.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
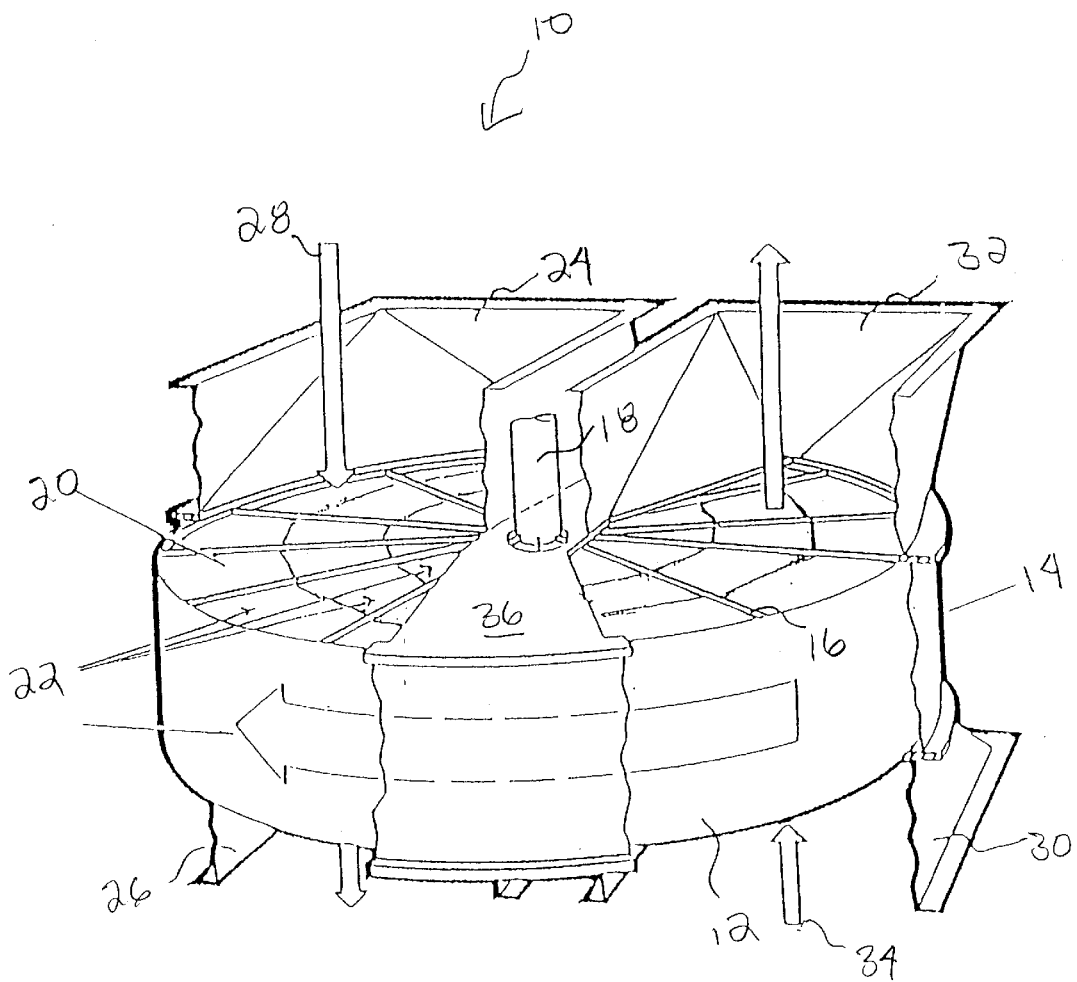
FIG. 1 is a perspective view, partially broken away, of a conventional rotary regenerative preheater for which the present invention can be employed.

With reference to FIG. 1 of the drawings, a conventional rotary regenerative preheater is generally designated by the numerical identifier 10. The air preheater 10 has a rotor 12 rotatably mounted in a housing 14. The rotor 12 is formed of diaphragms or partitions 16 extending radially from a rotor post 18 to the outer periphery of the rotor 12. The partitions 16 define compartments 20 therebetween for containing heat exchange element basket assemblies 22.

The housing 14 defines a flue gas inlet duct 24 and a flue gas outlet duct 26 for the flow of heated flue gases 28 through the air preheater 10. The housing 14 further defines an air inlet duct 30 and an air outlet duct 32 for the flow of combustion air 34 through the preheater 10. Sector plates 36 extend across the housing 14 adjacent the upper and lower faces of the rotor 12. The sector plates 36 divide the air preheater 10 into an air sector and a flue gas sector. The arrows of FIG. 1 indicate the direction of a flue gas stream 28 and an air stream 34 through the rotor 12. The hot flue gas stream 28 entering through the flue gas inlet duct 24 transfers heat to the heat exchange element basket assemblies 22 mounted in the compartments 20. The heated heat exchange element basket assembles 22 are then rotated to the air sector of the air preheater 10. The stored heat of the heat exchange element basket assemblies 22 is then transferred to the combustion air stream 34 entering through the air inlet duct 30. The cold flue gas stream exits the preheater 10 through the flue gas outlet duct 26 and the heated air stream exits the preheater 10 through the air outlet duct 32.

Figure 2:
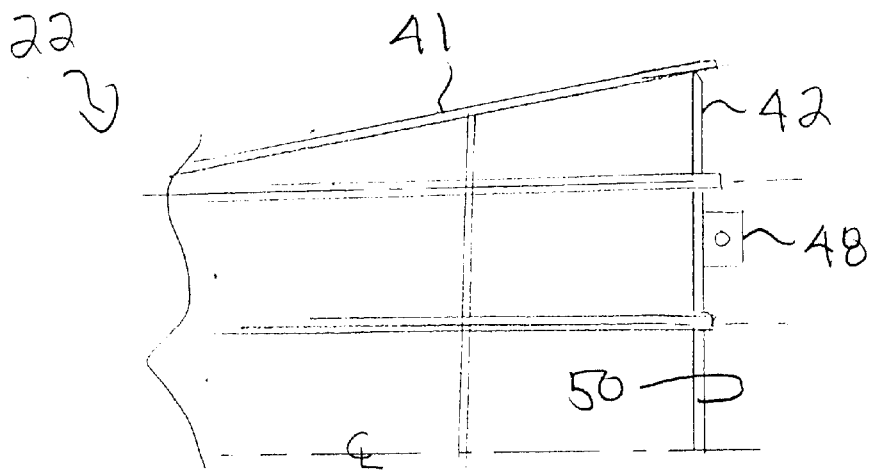
FIG. 2 is top view of a heat exchange element basket assembly having a cover with conventional lifting lugs.
Figure 3:
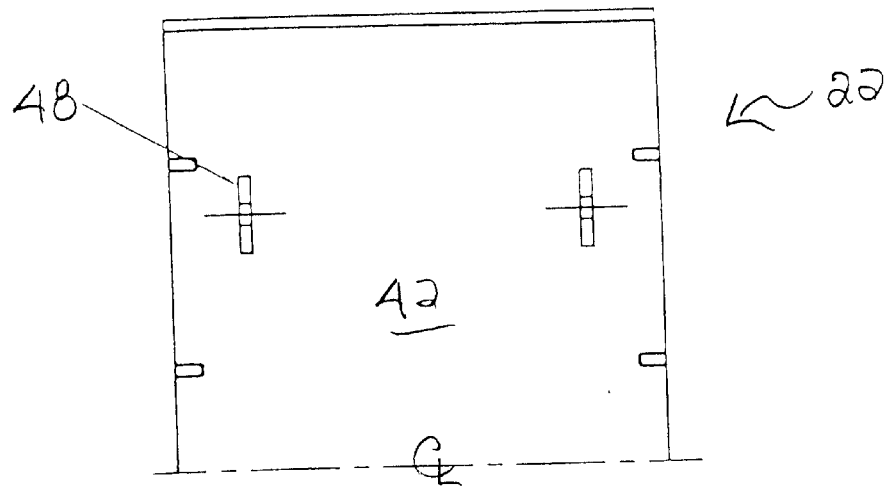
FIG. 3 is a front view of the heat exchange element basket assembly of FIG. 2.
Figure 4:
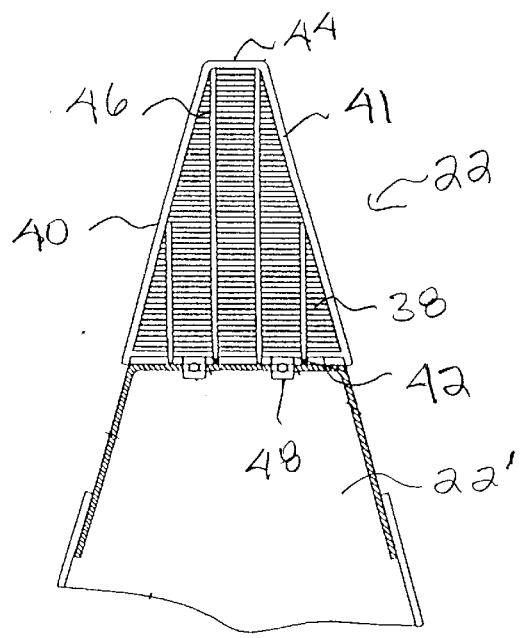
FIG. 4 is top view of the heat exchange element basket assembly of FIG. 2.

With reference to FIGS. 2–4, the heat exchange element basket assemblies 22 are generally formed in a sector or wedge shape and comprise multiple heat exchange elements 38 which are arranged vertically within a basket 40 and, therefore, within the preheater 10. The basket 40 has peripheral side plates 41, a cover 42, an end plate 44, and structural supports 46 extending between the cover 42 and the end plate 44 which support the heat exchange elements 38.

The cover 42 of a conventional basket 40 is a substantially planar surface. One or more lifting lugs 48 are welded to the outer face 50 of the cover 42 for use in lifting the heat exchange element basket assembly 22. The lifting lugs 48 extend radially from the outer face 50 of the cover 42, and would interfere with an adjacent heat exchange element basket assembly 22' (FIG. 4) or the rotor 12 (FIG. 2) if left installed.

Consequently, conventional lifting lugs 48 must be removed after the heat exchange element basket assembly 22 is installed and re-welded to the cover 42 prior to removal of the assembly 22.

With reference to FIGS. 5–8, the cover 54 of a basket 57 in accordance with the invention is a metal sheet having a vertical groove 56, preferably having a V-shape cross-sectional profile, which extends radially inward into the basket 57. As used in the description of the subject invention, vertical, horizontal, upper and lower are defined with respect to an installed heat exchange element basket assembly 76.

Preferably, upper and lower lifting lugs 58, 58' are mounted in upper and lower portions of the groove 56 such that the outer edge 60 of each lifting lug 58, 58' is recessed behind the outer face 62 of the cover 54. Alternatively, a single lifting lug may be mounted at the vertical centerline 64 of the groove 56 and/or the outer edge 60 of the lifting lug(s) 58 may be flush with the outer face 62 of the cover 54.

Each lifting lug 58 is a horizontal plate with an opening 66 extending vertically through the plate for receiving a hook of the lifting device. The plate has a shape which is complementary to the shape of the groove 56. For the V-shaped groove 56 of FIGS. 5–7, the plate will preferably have a trapezoid-shaped. That is, the side edges 68 form an angle 70 with the outer edge 60 which is substantially complementary to the angle 72 formed between the sides 74 of the groove 56 and the outer face 62 of the cover 54. Preferably, the side edges 68 of the lifting lug are 58, 58' welded to the sides 74 of the groove 56 to mount the lifting lug 58, 58' to the cover 54. Consequently, the weld material will bridge any gap which may formed between the side edge 68 of the lifting lug 58, 58' and the side 74 of the groove 56. The geometry of the lifting lug 58, 58' is optimized to minimize loss of heat exchange surface.

Figure 5:
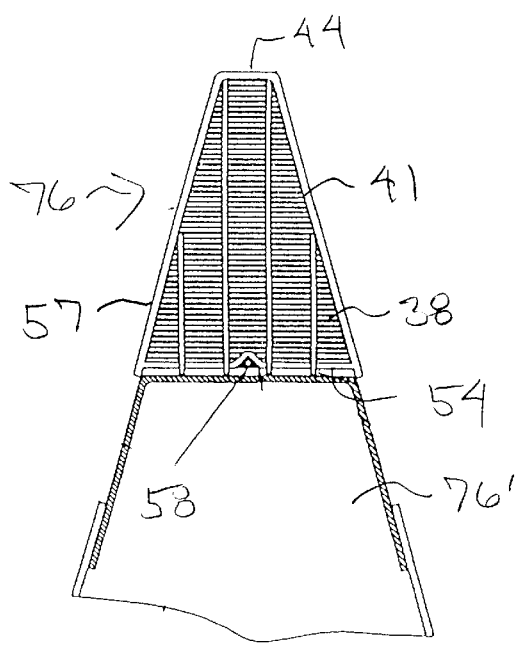
FIG. 5 is top view of a heat exchange element basket assembly having a cover with recessed lifting lugs in accordance with the invention.
Figure 6:
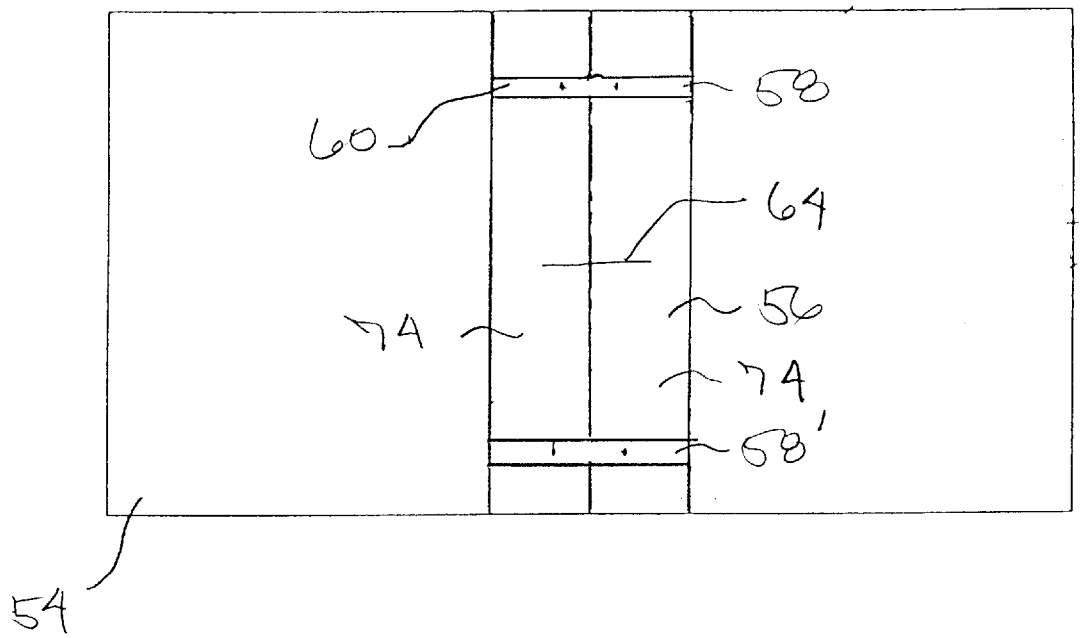
FIG. 6 is a rear view of the end plate of the cover of FIG. 5.
Figure 7:
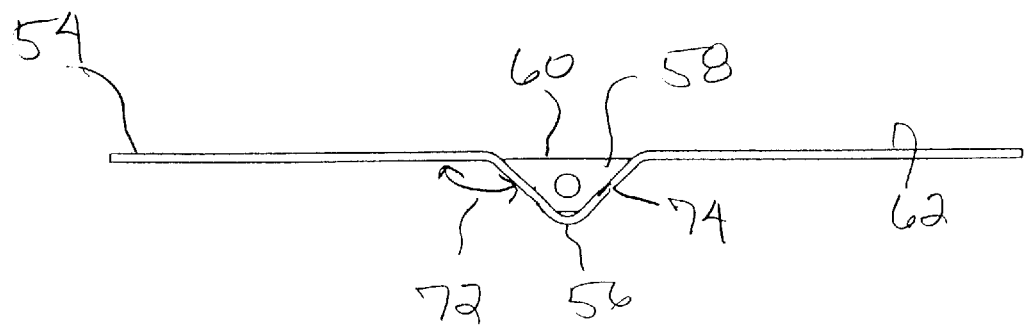
FIG. 7 is an enlarged top view of the end plate of the cover of FIG. 5.
Figure 8:
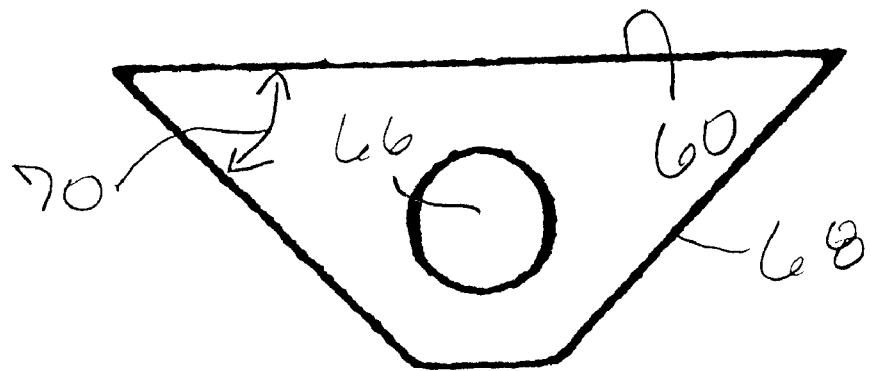
FIG. 8 is an enlarged top view of the lifting lug of the cover of FIG. 5.

As shown in FIG. 5, the lifting lug 58, 58' does not project into the space of another preheater component, such as an adjacent heat exchange element basket assembly 76'. Accordingly, the lifting lugs 58, 58' do not need to be removed after installation of the heat exchange element basket assembly 76. The lifting lugs 58, 58' are installed in the most controlled and reliable environment, a shop facility. This provides for the greatest possible quality welds.

It should be appreciated that the formed cover 54 provides additional structural rigidity to the cover, reducing deflection of the cover 54 caused by compressing and retaining the basketed heat exchange element 38. It should further be appreciated that the groove 56 may be formed with a relatively simple stamping operation.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A cover for a heat exchange element basket assembly including a plurality of heat exchange elements arranged within a basket, the cover being adapted to form a portion of the basket and comprising:

a metal sheet having inner and outer surfaces and a vertical groove extending inward from the outer surface, the groove having a cross-sectional profile; and at least one lifting lug, each lifting lug comprising a horizontal plate having an outer edge and a shape which is substantially complementary to the cross-sectional profile of the groove, the plate defining an opening extending vertically there through, each lifting lug being mounted within the groove, whereby the outer edge of the lifting lug does not extend beyond the outer surface of the metal sheet.

2. The cover of claim 1 wherein the groove has a V-shape and the plate has a trapezoid shape.

3. The cover of claim 1 wherein the cover comprises first and second lifting lugs mounted in upper and lower portions of the groove.

4. The cover of claim 1 wherein the outer edge of the lifting lug is recessed behind the outer surface of the metal sheet.

5. The cover of claim 1 wherein the outer edge of the lifting lug is flush with the outer surface of the metal sheet.

6. The cover of claim 1 wherein the groove has a vertical centerline and the lifting lug is mounted within the groove at the vertical centerline.

7. The cover of claim 1 wherein the groove has at least one side and the lifting lug also has at least one side edge, each side edge of the lifting lug being welded to a side of the groove.

8. A cover for a heat exchange element basket assembly including a plurality of heat exchange elements arranged within a basket, the cover being adapted to form a portion of the basket and comprising:

a metal sheet having inner and outer surfaces and a vertical groove extending inward from the outer surface, the groove having first and second sides defining a V-shaped cross-sectional profile; and first and second lifting lugs disposed in upper and lower portions of the groove, each lifting lug comprising a horizontal plate having first and second side edges and a front edge defining a trapezoid shape, the plate defining an opening extending vertically there through, the first and second side edges of the lifting lug being mounted to the first and second sides of the groove, respectively, whereby the outer edge of the lifting lug does not extend beyond the outer surface of the metal sheet.

9. A heat exchange element basket assembly comprising:

a basket including
an end plate,
a cover having inner and outer surfaces, a vertical groove extending inward from the outer surface, the groove having first and second sides defining a V-shaped cross-sectional profile,
at least one structural support extending between the end plate and the cover, and
at least one lifting lug disposed in the groove, each lifting lug comprising a horizontal plate having first and second side edges and a front edge defining a trapezoid shape, the plate defining an opening extending vertically there through, the first and second side edges of the lifting lug being mounted to the first and second sides of the groove, respectively, whereby the outer edge of the lifting lug does not extend beyond the outer surface of the cover; and a plurality of heat exchange elements arranged within the basket.

\* \* \* \* \*